US012380869B2

(12) United States Patent
Rössl et al.

(10) Patent No.: US 12,380,869 B2
(45) Date of Patent: *Aug. 5, 2025

(54) RADIO BASE STATION FOR COMBINED RADIO COMMUNICATION

(71) Applicant: VusionGroup GmbH, Fernitz-Mellach (AT)

(72) Inventors: Andreas Rössl, Fernitz-Mellach (AT); Andreas Hechenblaickner, Fernitz-Mellach (AT); Danijel Mom, Fernitz-Mellach (AT)

(73) Assignee: Vusion Group GmbH, Fernitz-Mellach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,765

(22) Filed: Feb. 2, 2024

(65) Prior Publication Data

US 2024/0177689 A1     May 30, 2024

Related U.S. Application Data

(63) Continuation of application No. 17/287,561, filed as application No. PCT/EP2018/079506 on Oct. 26, 2018, now Pat. No. 12,033,601.

(51) Int. Cl.
*H04W 88/08* (2009.01)
*G06K 19/02* (2006.01)
(Continued)

(52) U.S. Cl.
CPC ............. *G09G 5/12* (2013.01); *H04W 74/04* (2013.01); *H04W 88/08* (2013.01);
(Continued)

(58) Field of Classification Search
None
See application file for complete search history.

(56) References Cited

U.S. PATENT DOCUMENTS 6,550,673 B2   4/2003   Massaro
6,897,763 B2   5/2005   Schulmerich et al.
(Continued)

FOREIGN PATENT DOCUMENTS

DE   10 2014 114 666 A1   3/2016
WO   2016/045707 A1       3/2016

OTHER PUBLICATIONS

Communication pursuant to Article 94(3) EPC issued by the European Patent Office on Apr. 17, 2024, which corresponds to European Patent Application No. 18796875.5-1206 and is related to U.S. Appl. No. 18/431,765.

*Primary Examiner* — Pablo N Tran
(74) *Attorney, Agent, or Firm* — Studebaker Brackett PLLC

(57) ABSTRACT

Radio base station, having a first radio module for radio communication with first radio communication devices, and a connection for connecting an ESL radio module for radio communication with electronic display panels, wherein the radio base station has a first, in particular software-based, control stage for controlling the radio communication of the first radio module according to a first communication protocol, and a second, in particular software-based, control stage for controlling the radio communication of the ESL radio module connectable to the connection according to a second communication protocol, and a, in particular software-based, third control stage for predictively changing a time sequence, defined for a future period, of radio activities of the first radio module on the basis of radio activities of the ESL radio module that are defined for said future period.

15 Claims, 6 Drawing Sheets

(51) Int. Cl.
   *G06K 19/07*   (2006.01)
   *G09G 5/12*    (2006.01)
   *H04W 72/12*   (2023.01)
   *H04W 74/04*   (2009.01)
   *H04W 84/12*   (2009.01)

(52) U.S. Cl.
   CPC ..... *G09G 2370/16* (2013.01); *G09G 2380/04* (2013.01); *H04W 84/12* (2013.01)

(56) References Cited

U.S. PATENT DOCUMENTS

| | | | |
|---|---|---|---|
| 8,134,992 B1 | 3/2012 | Nam et al. | |
| 9,134,398 B2* | 9/2015 | Dupray | G01S 5/0009 |
| 9,704,124 B2* | 7/2017 | Jones | G06Q 30/02 |
| 9,805,539 B2* | 10/2017 | Swafford, Jr. | G07F 11/42 |
| 9,818,148 B2* | 11/2017 | Bynum | G06Q 30/0639 |
| 10,210,478 B2* | 2/2019 | Johnson | G06Q 30/02 |
| 10,357,118 B2* | 7/2019 | Swafford | A47F 5/0068 |
| 10,586,473 B2 | 3/2020 | Goel et al. | |
| 10,684,350 B2 | 6/2020 | Dupray et al. | |
| 11,109,692 B2* | 9/2021 | Swafford | A47F 10/02 |
| 11,182,738 B2* | 11/2021 | Costello | A47F 5/0861 |
| 2005/0030158 A1* | 2/2005 | Schulmerich | G06F 3/1462 |
| | | | 340/5.91 |
| 2010/0177076 A1* | 7/2010 | Essinger | G09G 3/344 |
| | | | 345/212 |
| 2010/0177749 A1 | 7/2010 | Essinger et al. | |

* cited by examiner

RADIO BASE STATION FOR COMBINED RADIO COMMUNICATION

TECHNICAL FIELD

The invention relates to a radio base station for combined radio communication.

The invention further relates to a system with said radio base station.

Background

A radio base station (also called radio access point or simply access point) mentioned in the beginning for combined WLAN ESL communication is known for example from the WO 2016/045707. The known radio base station comprises both a separate WLAN radio module for WLAN communication and a separate ESL radio module for ESL communication. The two radio modules are connected to a control line. With the aid of the control line the one radio module can influence the radio activity of the other radio module in order to process its radio activities without interference.

The mutual interaction with the aid of the control line provides basically a very robust solution. However, it means that the radio base station has to be adapted at relatively great expense in terms of hardware.

It is the objective of the invention to propose an improved radio base station.

SUMMARY OF THE INVENTION

This objective is met by a radio base station according to claim 1. Accordingly the subject of the invention is a radio base station comprising a first radio module for radio communication with first radio communication devices and a connection for connecting an ESL radio module for radio communication with electronic display signs, wherein the radio base station comprises a first, in particular software-based, control stage for controlling the radio communication of the first radio module according to a first communication protocol, and a second, in particular software-based, control stage for controlling the radio communication of the ESL radio module connectable to the connection according to a second communication protocol, and a, in particular software-based, third control stage for predictively changing a time sequence defined for a future time period of radio activities of the first radio module, on the basis of radio activities defined for said future time period, of the ESL radio module.

The objective is further met by a system according to claim 10. The subject of the invention is therefore also a system comprising an inventive radio base station and an ESL module connected to the connection.

The object is further met by a method according to claim 12. Accordingly the subject of the invention is a method for controlling a radio communication of a radio base station, wherein the radio base station comprises a first radio module for radio communication with first radio communication devices and a connection for connecting an ESL radio module for radio communication with electronic display signs, wherein according to the method a first, in particular software-based, control stage controls the radio communication of the first radio module according to a first communication protocol, and a second, in particular software-based, control stage controls the radio communication of the ESL radio module connected to the connection according to a second communication protocol, and a third, in particular software-based, control stage predictively changes a time sequence defined for a future time period of radio activities of the first radio module on the basis of radio activities of the ESL radio module as defined for said future time period.

The measures according to the invention bring with them the advantage that the radio activity of the first radio module can be activated and muted not only for a defined time period concerning a radio activity to be currently performed, but that decisions can be taken as regards the availability of the respective radio activities for a future time period across a time sequence of planned radio activities. This corresponds to planning/coordination of the time ranges available to the first radio module within the future time period, in order to accommodate the radio activities of the first radio module within the future time period in a selection of free time ranges. The time ranges predictively occupied or probably to be occupied by the ESL radio module for said time period are omitted for the radio activities of the first radio module, so that the future radio activities of the ESL radio module can run without interference within the future time period. A future time period generally extends following the currently running radio activity, in particular in relation to the currently running radio activity of the ESL radio module, wherein it covers, viewed over time, a number of several radio activities.

Further, in particular advantageous, designs and further developments of the invention are revealed in the dependent claims and the subsequent description. Features of one claim category can be further developed corresponding to features of the other claim category, so that the effects and advantages stated in conjunction with the one claim category also exist for the other claim category.

Radio activities are understood to be both transmitting and receiving radio activities.

The first radio model can basically support any random radio standard differing from the ESL radio module. For example ZigBee or BlueTooth may be used. However the particularly preferred use of the invention lies in a configuration of the radio base station, in which the first radio module is WLAN capable—WLAN meaning "wireless local area network"—or Wi-Fi certified (e.g. IEEE-802.11). The same applies to the first radio communication devices. Such a first radio module produces a hardly predictable radio traffic, the influence of which on time-critical radio activities of the ESL radio module can be serious, unless the measures specified in the invention are taken.

The ESL radio module is a radio module developed for communicating with electronic display signs, in particular price or product information display signs. The technical jargon for such electronic display signs is "electronic shelf label" or ESL for short.

The connection may be any connection designed for parallel or serial data transmission. The design of the connection may refer to both electro-mechanical connections as well as, as required, to electronic (switching) components or protocol aspects. Furthermore the connection may be designed according to the specification of a standardising organisation or a consortium. For example the connection may be proprietary plug, which is used for Ethernet communication. It may also be a known "universal serial bus" connection, which may be present in the different variants (USB 1, 2, 3) or constructional designs (e.g. micro, mini etc. or also type C). The ESL radio module may be connected to the USB connection outside the device housing of the radio base station or accommodated within the device housing. In particular then, when both radio modules are accommodated in a single device housing, both aerials (at least two) of the two radio modules are attached relatively closely to each other on the device housing. This may however also be case with an ESL radio module located outside the device housing of the radio base station.

The above-mentioned electronic display signs may, for their energy supply, have an energy store such as a battery or a solar panel coupled to a rechargeable battery (e.g. accumulator). A display unit of such display signs may for example be realised with the aid of LCD technology, preferably however electronic ink technology (also called e-ink as synonym for electronic paper).

In order to operate as energy-efficiently as possible, the display signs have various operating states. When in an active state, the energy consumption of a display sign is relatively high. The active state exists e.g. during transmitting radio activities for the transmission of data and during receiving radio activities for the receipt of data, during internal processing of data such as during updating the contents of the display (the so-called display update) or when taking battery voltage measurements. In the sleep state by contrast the energy consumption is relatively low. For the sleep state as many electronic components as possible are preferably isolated/disconnected from the energy supply or at least operated in a mode with minimum energy demand.

Consequently the active state predominantly exists in the time ranges defined for when the display sign communicates with the ESL radio module. In the active state the display sign comprises ready-to-receive capability in order to receive commands and, as required, also to receive data from the ESL radio module and process it with the aid of its logic level. In the active state it is also possible with the aid of the logic level to generate transmission data and communicate it to the ESL radio module. In order to work in an energy-efficient manner and thereby to achieve as long a service life as possible for the battery of the display sign, the basic operating strategy consists in keeping the display sign in the sleep state for as long as possible and only operate it in the active state for a shortest possible time range, when this is absolutely necessary for the purpose of data transmission to the ESL radio module or for ascertaining synchronism.

With such display signs relatively high energy consumption is always inevitable in case of a communication the ESL radio module. Therefore disturbances in this radio activity caused by another, i.e. the first radio module, which of necessity lead to an undesirable lengthening of the communication duration of the respective display sign with the associated ESL radio module, have an extremely negative effect on the service life of the battery of the electronic display sign. For the first time now, the invention makes it possible, within a defined future time period, to give predictive preference to the ESL radio module used for the communication with the electronic display signs and thereby to predictively avoid disturbances in radio traffic with the electronic display signs.

The inventive measures therefore, expressed in other words, ensure that future use of the common radio medium can be planned/coordinated, wherein care must be taken that always only mutually compatible radio activities of the two radio modules are present, which do not lead to any mutual negative interference. Such joint simultaneous utilisation of the radio medium is e.g. given when then, both radio modules show simultaneous receiving radio activity, but on different radio channels. Apart from this special case it will typically always be the case that in planning its future use the radio medium is used exclusively by the one or the other radio module. The reason, why this is important, is because the two radio aerials of the two radio modules are positioned in relatively close proximity to each other, so that mutual negative interference has always to be expected if both radio modules simultaneously show radio activities, independently of whether the two radio modules use different radio channels.

Said coordination is preferred of necessity if both radio communications are taking place in the same frequency band, e.g. in the 2.4 GHz frequency band. Typically different channels can be used in a frequency band (2.4 GHz defines a total of 79 channels, therefore it is possible to have several channels on different frequencies; different systems may have different channel widths—WLAN has a channel width of 20 MHZ, the ESL radio system has only 1 MHz channel width).

Now, in the simplest case, it would be possible to use different channels with non-overlapping frequencies for the first radio module and the ESL radio module, and there would in theory be no mutual interference between the two systems. In reality however no transceiver is perfect and interference signals will always be generated during transmission outside the chosen frequency of the channel. Thus interferences occur on lower or higher frequencies, which diminish as the distance between frequencies increases (sideband interferences). In the main the interference signal interferes during receipt of data (=receiving radio activity), because the data arrives at the radio base station with very low power. Power decreases quadratically with distance. Signals transmitted by the radio base station itself are hardly affected because these with their strong transmission power outshine the sideband interference of the other radio module. This effect is called "blocking". It would be possible, with very expensive hardware filters to strongly reduce the interference signal on the sidebands, but on grounds of cost this is not done in practice.

In particular then, when channels on the same frequency/ on overlapping frequencies are used for the first radio module and the ESL radio module, it is mandatory that transmitting radio activities of the ESL radio module (e.g. for sending the synchronisation data signal or also data packets) are protected against signal interferences caused by the first radio module. In practice however, this case can be avoided through a channel suitable choice of without overlapping frequencies, which contributes to improved performance of the overall system, because temporal transmission restrictions are reduced or completely avoided.

Now, if channels are used for both radio modules, which show no overlapping frequencies, the focus during predictive planning/coordination is less on the signals (transmitting radio activity) sent by the base station (in particular the ESL radio module), but above all on those signals transmitted by ESL itself, which are expected from the ESL radio module during fixed predefined time windows. This may be for example acknowledgement data or partial acknowledgement data, which is generated by ESL in consequence of the execution of commands previously received by the ESL radio module. It is even possible for transmitting radio activities of the first radio module to occur at the same time as these ESL-radio-module-receiving radio activities.

It is however worth recommending when using different channels without overlapping frequencies, that also those situations be treated predictively, in which transmitting by the first radio module and receiving by the ESL radio module or vice versa occurs simultaneously.

According to a preferred aspect of the invention a second communication protocol different from the first communication protocol is used during communication with the electronic display signs. In particular this is a proprietary time slot communication process or protocol, in which, in repeating sequence, a number of time slots per time slot cycle are available for communication, wherein in particular each time slot is characterised by a unique time slot symbol. As part of this time slot communication process individual electronic display signs can be addressed and/or provided with (command/display) data, and also data can be received from the display signs.

With the time slot communication process m time slots, e.g. 256 time slots are used within e.g. n seconds, such as 15 seconds. The n seconds form a time slot cycle, which continuously repeats. In this time slot communication process m time slots are thus available within one time slot cycle for a communication with the display signs. Each of these display signs may be assigned to one of the time slots, wherein even several electronic display signs may be assigned to one certain time slot. In a system, in which e.g. during a time slot cycle of 15 seconds there exist 256 time slots of 58.5 milliseconds each, it is possible to address two to five display signs per time slot individually without problems and to delegate individual tasks with a command to them. Each electronic display sign can confirm execution (completion) of an executed command with acknowledgement data, which is preferably sent in that time slot, in which the command was received. Outside the time slot defined for the respective electronic display sign the electronic display sign is predominantly operated in the energy-saving sleep state.

In order to ensure synchronism in the ESL radio system (ESL radio module and a number of radio-technically assigned electronic display signs), the ESL radio module is configured to send a synchronisation data signal comprising the time slot symbol for the currently present time slot, preferably at the beginning of each time slot.

In the sleep state the logic level/a temporal control stage of the electronic display sign performs only those activities, which are needed for correctly timing the waking-up, so that the price display sign can determine its synchronous state (synchronism with the ESL radio module) at the next time slot destined for it for receiving the synchronisation data signal, and/or is ready for communication with the radio module. Each display sign knows, which time slot symbol indicates the time slot destined for it. Each display sign thus orientates itself individually on the occurrence of a time slot symbol relevant to it, identifies the time slot symbol relevant to it and defines its next waking-up time using the timing of the time slot communication process predefined by the radio base e station. The display sign thus determines its synchronism with the ESL radio module solely through recognising the time slot symbol, which occurs at the expected point of time/appears in an expected time window and which indicates the time slot destined for it. Such a time slot symbol may for example be given by the lowest-value byte of the individual and unique device address of the display sign. Insofar as no individual addressing exists for the display sign determining its synchronism, this will immediately after recognising its synchronism change back into the energy-saving sleep state and remain in this sleep state until the next waking-up time. A synchronous display sign will thus be operated for as long as possible in its sleep state with the lowest possible energy consumption, in order to extend the service life of the battery for as long as possible. In case synchronism is not detected because for example the radio activity of the ESL radio module was disturbed, the electronic display sign would assume a state of increased energy consumption in order to bring about an automatic, in particular autonomous re-synchronisation (i.e. without bi-directional communication with the radio base station).

Since, as revealed in the preceding discussions, the second communication protocol preferably used with the ESL radio module requires a very strict temporal behaviour of the radio activities or at least of some of the radio activities such as the emitting of a time slot symbol, it has proven to be particularly efficient to systematically exclude the interferences, which can occur through radio activities of the first radio module and can lead to an alleged loss of synchronism, not as is usual with known systems for the moment of communication of the ESL radio module, but rather predictively for future radio activities in the common radio medium through an automatic planning of these radio activities. This is also accompanied by a substantially more efficient radio activity of the two radio modules.

Thus for example for a second communication protocol, which during a time slot cycle of 15 seconds provides 256 time slots of approx. 58.5 milliseconds each, the future time period to be taken into account can have a duration of 0.5-15 seconds. Preferably the future time period has however a duration of approx. 0.5-3, in particular 0.75-1.5 seconds. The time details given here are based on experiments of the applicant. They are dependent on the communication with a server (see further below), the storage demand or even the reaction time.

It should generally be kept in mind that a meaningful future time period is a multiple of the time, for which individual "radio activities" of both radio systems use the radio medium. For the ESL radio module typical values are 2-54 seconds. For WLAN this may even be several hundred milliseconds. A larger time period makes predictive planning more complicated, but opens up more possibilities during coordinating. The ideal time period is thus a compromise between the complexity during predictive planning and the effectiveness during coordinating.

The time values mentioned above contribute to a good balance between a stable ESL radio system, in which synchronism for the respective display signs can be reliably ascertained, and sufficient flexibility for taking into account radio activities to be completed over time, this without causing needlessly high expenditure in terms of processing/planning for the future time period. Viewed long term, i.e. over the entire operating period of the ESL radio system for example, this also leads to an energy-optimised operating scenario.

According to a further aspect of the invention the radio base station comprises an electronic circuit, the USB connection mentioned and a programmable circuit component for executing a software, with the aid of which said first control stage and/or said second control stage and/or said third control stage is realised. Realisation of the control stages may be effected by hardware components of the circuit (even e.g. exclusively). This may be done by using for example an Application Specific Integrated Circuit (ASIC). Equally a single chip processor or a microprocessor with its typical peripheral building blocks (input/output, storage modules etc.) may be used, on which a software is processed, which provides the functionality of the respective control stage through the use of software. This software-based solution may e.g. be, for the first control stage, a WiFi device driver for controlling the first radio module which in this case is realised as a WiFi radio module and, for the ESL control stage, is an ESL device driver for controlling the ESL radio module, which is connected to the electronic circuit via said USB connection.

The third control stage can be called/realised as a software-based radio coordinator, because this software plans/coordinates, which radio activities shall take place within which time ranges within the future time period. It may be configured as a component of the software of the device driver for the first or for the second radio module or may also be present and executed as a separate software component.

According to a further aspect of the invention the radio base station may comprise a storage tier for storing a first queue data structure representing the future time sequence of radio activities of the first radio module second and a queue data structure representing the future time sequence of radio activities of the ESL radio module. These queue data structures are called "queue" in the technical jargon and they serve to buffer data objects in chronological order before these are further processed by the respective device driver. Preferably the third control stage is configured for reading (the data objects) of the second queue data structure and taking into account the time sequence of the radio activities defined there (represented by said data objects) for changing the time sequence of the radio activities (represented by said data objects), which are stored in the first queue data structure for said future time period. This ensures priority of the ESL radio activities over those of the first radio module.

According to a further aspect of the invention it may be of advantage if the third control stage is also configured for predictively changing the time sequence defined by the second control stage for said time period, of radio activities of the ESL radio module on the basis of radio activities of the first radio module defined for said time period by the first control stage. This permits taking the radio activities of both radio modules into account in a balanced manner, when using the common radio medium.

For the purpose of realising this functionality it has proven to be advantageous if the third control stage is also configured for reading the first queue data structure and taking into account the time sequence of the radio activities as defined in there, for changing the time sequence stored in the second queue data structure of the radio activities for said future time period. This also permits intervention with the data objects—in particular their temporal occurrence during radio-technical processing—of the second queue data structure. In this respect the third control stage is given the role of a software-based co-existence coordinator.

In general it be stated that the sequence total stored in the first queue data structure of radio activities represents a first future total communication period and the sequence total stored in the second queue data structure of radio activities represents a second future total communication period and that the first total communication period may be different from the second total communication period, such as e.g. seconds for the first and 5 seconds for the second total communication period. The actual duration of the respective future total communication period results de the facto from respectively existing future communication demand. Also, the respective maximum admissible total communication period, in particular tailored to the communication protocol used, may be limited.

The future time period, for which the sequence of future radio activities has to be changed, may then be limited to the shorter of the two total communication periods/i.e. dynamically adjusted to the respective situation. Also said future time period may deviate from the previously mentioned two total communication periods, and for example refer to an essentially constant duration of e.g. approx. 1 second.

Independently of whether the radio activities of the first radio module or also the radio activities of the second radio module are to be changed, it has proven to be particularly advantageous to configure the third control stage for changing the respective queue data structure such that, as regards the temporal occurrence and/or as regards the succession of such temporal occurrences, radio activities defined as mandatory are maintained in the time ranges/the succession of such time ranges provided therefore, and that other radio activities are defined/planned in intermediate time ranges or subsequent time ranges. These measures ensure that those radio activities, which are necessary to maintain the stability of the respective radio system, can indeed take place in the correct temporal context. In addition it may be provided with this configuration that ultimately those radio activities of the ESL radio module, which are mandatory for maintaining the synchronism, are treated with the highest-most priority, in order to keep the energy consumption of the display signs to a minimum and to optimise their service life.

In order to make the previously discussed necessity of radio activity possible, a code may be stored in the respective queue data structure, which allows the respective radio activity to be made uniquely identifiable. The third control stage may then be configured such that it interprets the code and draws conclusions therefrom as to the necessity of the respective radio activity. It has however proven to be particularly advantageous if the third control stage is configured for taking into account metadata, wherein the metadata is stored in the respective queue data structure and (directly) indicates the necessity of the temporal occurrence of the respective radio activity or the type of the respective radio activity.

The metadata can categorise the respective radio activities in the queue data structure, such as e.g.:
- type of radio activity (e.g. synchronisation, data exchange, status query, etc.),
- temporal flexibility of the radio activity,
+ which provides information on the possibility of re-arranging the respective queue data structure (e.g. re-arranging allowed, re-arranging denied, because real-time transmission at the originally defined point in time is required, i.e. changing the temporal occurrence is denied) or
+ which allows to make a decision as to whether the temporal context in relation to other radio activities must be maintained or can be dissolved (e.g. chronological order and/or mutual temporal distance must be maintained), or
+ which allows to make a decision as to whether the respective radio activity may be divided up into different, in particular non-contiguous time ranges (e.g. dividing-up allowed, dividing-up denied),
- time duration of the radio activity, which allows to define the duration for the time range or the time ranges for the respective radio activity (e.g. duration of radio activities stated in absolute time units such as milliseconds, data quantity rated with transmission speed, etc.),
- priority of the radio activity for identifying the importance of the respective radio activity in the context of the respective communication protocol (e.g. indicated by the "high", "medium", "low" indicators).

According to a further aspect of the invention the third control state may be configured for making iterative changes such that initially the radio activities defined as mandatory are taken into account followed by the other radio activities for said time period. When changing the sequence of radio activities therefore the radio activities defined for said future time duration are analysed first, and then those radio activities are identified, which are mandatory and defined for the associated time range within the future time period, and only then are the other radio activities defined for time ranges within the viewed future time period, which are still free/unallocated. Two or more runs may be necessary for this process of defining the radio activities. This in particular then, when radio activities defined as mandatory for both the ESL radio module and for the first radio module are identified for one and the same time range or for at least overlapping time ranges. In this case a further change operation would be necessary in order to give preference to the radio activities of the ESL communication module in order to ensure the stability and efficiency of the ESL radio system. The radio activities of the first radio module identified as colliding, but rated as mandatory would then have to be defined in a further run in the time ranges which have remained free, and the time ranges which thereafter have still remained free would then be allocated to those radio activities which were identified as not mandatory. Here again a double or even multiple run can take place, in which initially the ESL radio activities of the first radio module rated as not mandatory and finally the radio activities of the first radio module rated as not mandatory, are defined in the future time period.

In order to ensure a sustainable optimal use of the common radio medium, it has proven to be particularly advantageous that the third control stage is configured for a continuous or stepwise adjustment of the change in time sequence defined by the respective control stage for said future time period, of radio activities with regard to the progress of time and/or newly added radio activities. This allows, for example, changing the sequence of radio activities for each newly added radio activity, which corresponds to a (quasi) continuous adjustment of the change. Equally, but preferably, a series of newly added radio activities may also be taken as a reason for adjusting the change in time sequence of the radio activities for a future time period. This corresponds to a blocked, stepwise adjustment of the change. As such 5, 10 or even 15 newly added radio activities for example may be used as a reason for adjusting the change in the time sequence of the radio activities for a future time period.

Finally the future period to be actually considered may not be a constant, but a function of the radio activities contained therein or to be taken into account. In this context the third control stage may however also be configured to keep the actual duration of the time period within predefined limits.

Preferably a system can be realised with the aid of the invention, which comprises (at least) one inventive radio base station and an ESL radio module connected to the USB connection. The system, which may e.g. be installed in a shop, may also comprise a number of electronic display signs, which are assigned to the ESL radio module in a radio-technical manner, e.g. by initial login (also called registration).

Furthermore a server (service) coupled to the radio base station may be provided for providing and/or processing data relating to the radio communication with the first radio communication devices and/or the electronic display signs. Coupling may for example be LAN-based or Cloud-based.

This and further aspects of the invention are revealed in the figures discussed below.

BRIEF DESCRIPTION OF THE FIGURES

The invention will now be discussed once more in detail with reference to the attached figures by way of exemplary embodiments, to which however the invention is not restricted. In the various figures identical components are marked with identical reference symbols. The figures are schematically drawn, each depicting.

DESCRIPTION OF EXEMPLARY EMBODIMENTS

Figure 1:
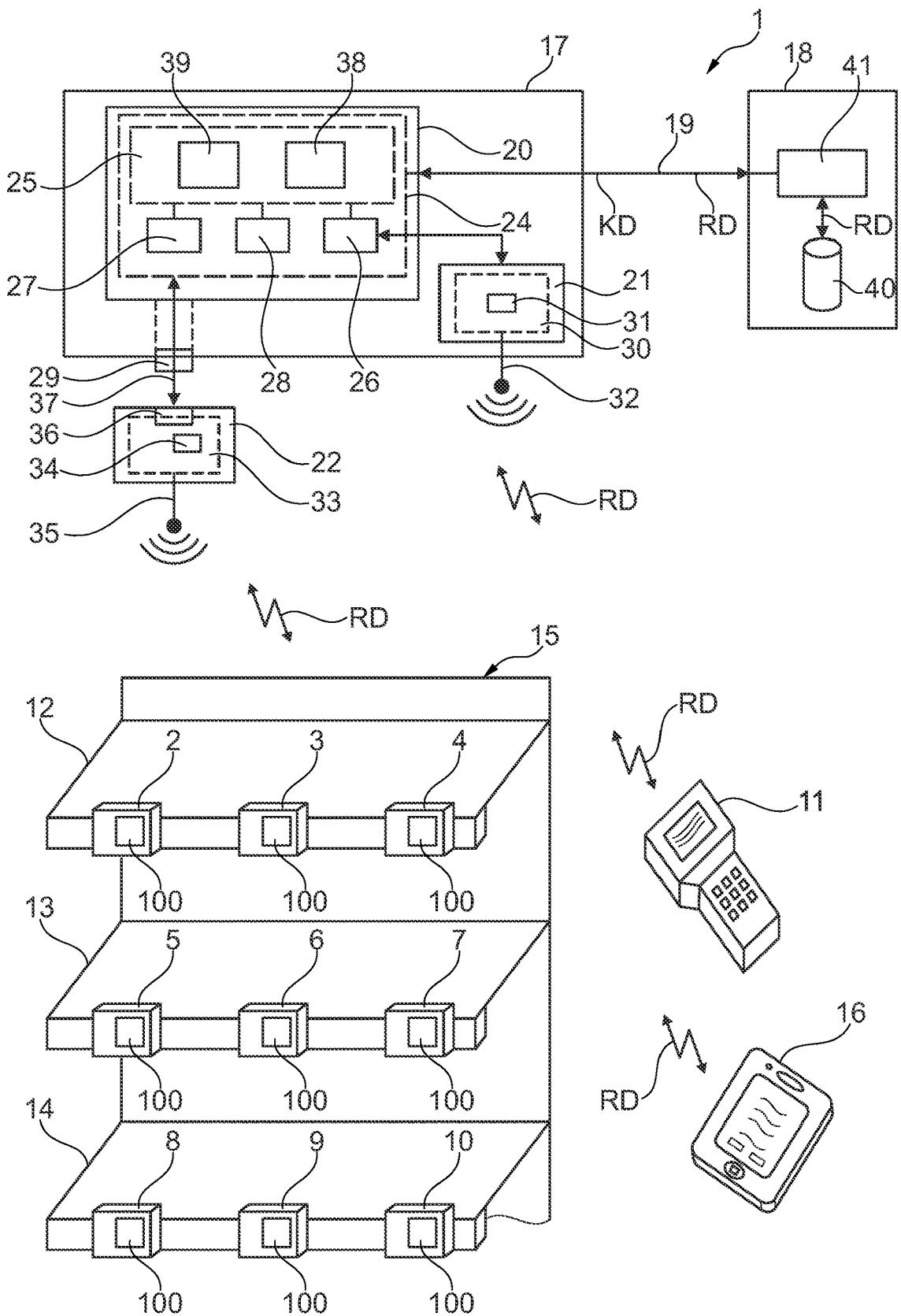
FIG. 1 an inventive system for WiFi and ESL communication.

FIG. 1 visualises an inventive system 1 installed in the premises of a supermarket, which provides a first radio network for WiFi radio communication in accordance with a first WiFi communication protocol with different WiFi-capable radio communication devices, such as one or more portable electronic barcode reading devices 11 which are part of an electronic product management the system of supermarket, or e.g. also mobile telephones or mobile computers of customers, in the following called user devices 16 for short, which may for example gain access to online-services via a WiFi guest access of the first radio network.

The system 1 also provides a second radio network in accordance with a second, namely proprietary communication protocol with a number of electronic price display signs 2-10, in the following called ESL 2-10 for short, which are also part of the electronic product management system of the supermarket. Each ESL 2-10 comprises a display unit 100 and is attached to shelf bases 12-14 of a shelf 15 according to the products (not shown) positioned on the shelf base, for which with their aid price and/or product information is displayed for the information of customers or supermarket personnel.

The two different communication protocols differ in their temporal behaviour and also comprise different priorities.

These radio networks are realised in that the system 1 comprises a radio base station 17, called station 17 for short, and a server 18, which are connected with each other via a local wired network (LAN) 19. The server 18 communicates via this LAN 19 with the station 17 using the TCP/IP protocol, wherein raw data RD embedded in communication data KD can be exchanged with the respective devices 2-10, 11 and 16.

The station 17 comprises a first electronic circuit 20, a first radio module 21 for radio communication with the barcode reading devices 11 and a USB connection 29, to which a second radio module 22 is connected, which is called an ESL radio module 22 for communication with the ESLs 2-10.

The circuit 20 comprises a micro controller 24 with a memory 25, which comprises a non-volatile memory area (e.g. ROM—Read Only Memory—or E/\2PROM—Electrically Erasable Read Only Memory) and a volatile memory area (e.g. RAM—Random Access Memory), both of which however are not depicted. Three control stages are realised with the aid of software modules, which are stored in the non-volatile memory area and which are processed on the microcontroller 24; a first control stage 26 which is the WiFi device driver for controlling the WiFi radio communication, a second control stage 27, which is the ESL device driver for controlling the ESL radio communication and a third control stage 28 for predictively changing the time sequence defined by the first control stage 26 for a future time period, of WiFi radio activities of the first radio module 21 on the basis of ESL radio activities defined by the second control stage 27 for said future time period, of the ESL radio module 22, the latter to be discussed in detail further below.

The first radio module 21 comprises a second programmable electronic circuit 30, which processes a first firmware 31 of the first radio module 21. The first radio module 21 and the first electronic circuit 24 are installed in the device housing (not shown) of the radio base station 17 and electronically connected to each other. A first aerial 32 connected to the second electronic circuit 30 is mechanically fastened to the device housing. The aerial 32 may however also be located 1 installed internally in the device housing.

The ESL radio module 22 comprises a third programmable electronic circuit 33, which processes a second firmware 34 of the ESL radio module 22. The ESL radio module 22 is located externally to the device housing of the radio base station 17 and comprises a third programmable electronic circuit 33, which processes a second firmware 34 of the ESL radio module 22. The ESL radio module 22 is located outside the device housing of the radio base station 17 and comprises its own device housing (not shown). A second aerial 35 electronically connected to the third electronic circuit 33 is mechanically fastened to the device housing of the ESL radio module 22. The ESL radio module 22 comprises a USB plug 36, which connects the third circuit 33 to the USB connection 29 via a USB cable 37.

The server 18 comprises a data storage tier 40, e.g. for storing a database for storing all information relating to the product management system and/or the communication with individual subscribers of the radio network. A software which runs on a data processing stage 41 of the server 18 realises the product management system.

Figure 2:
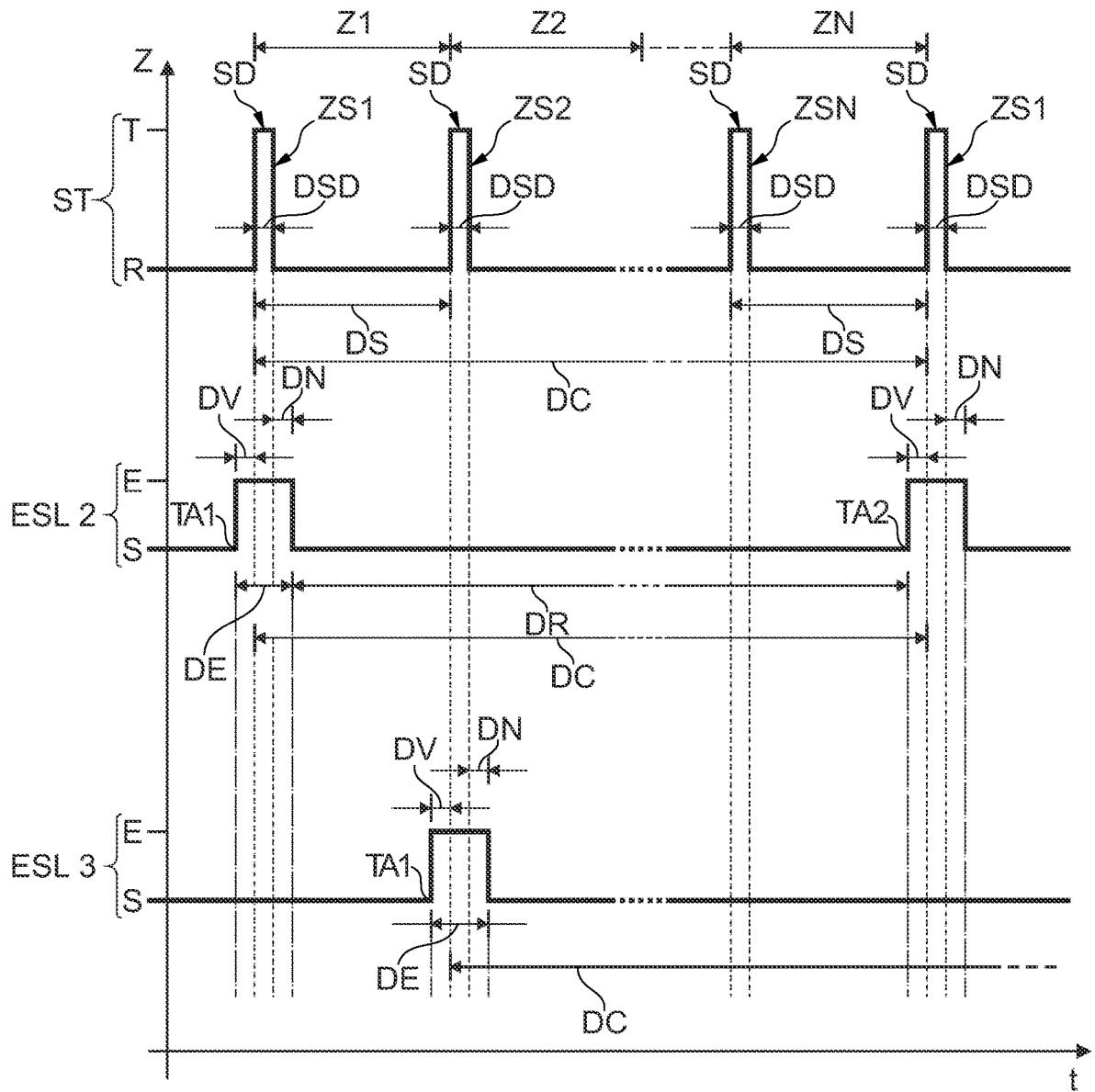
FIG. 2 a first state diagram relating to the ESL communication.
Figure 3:
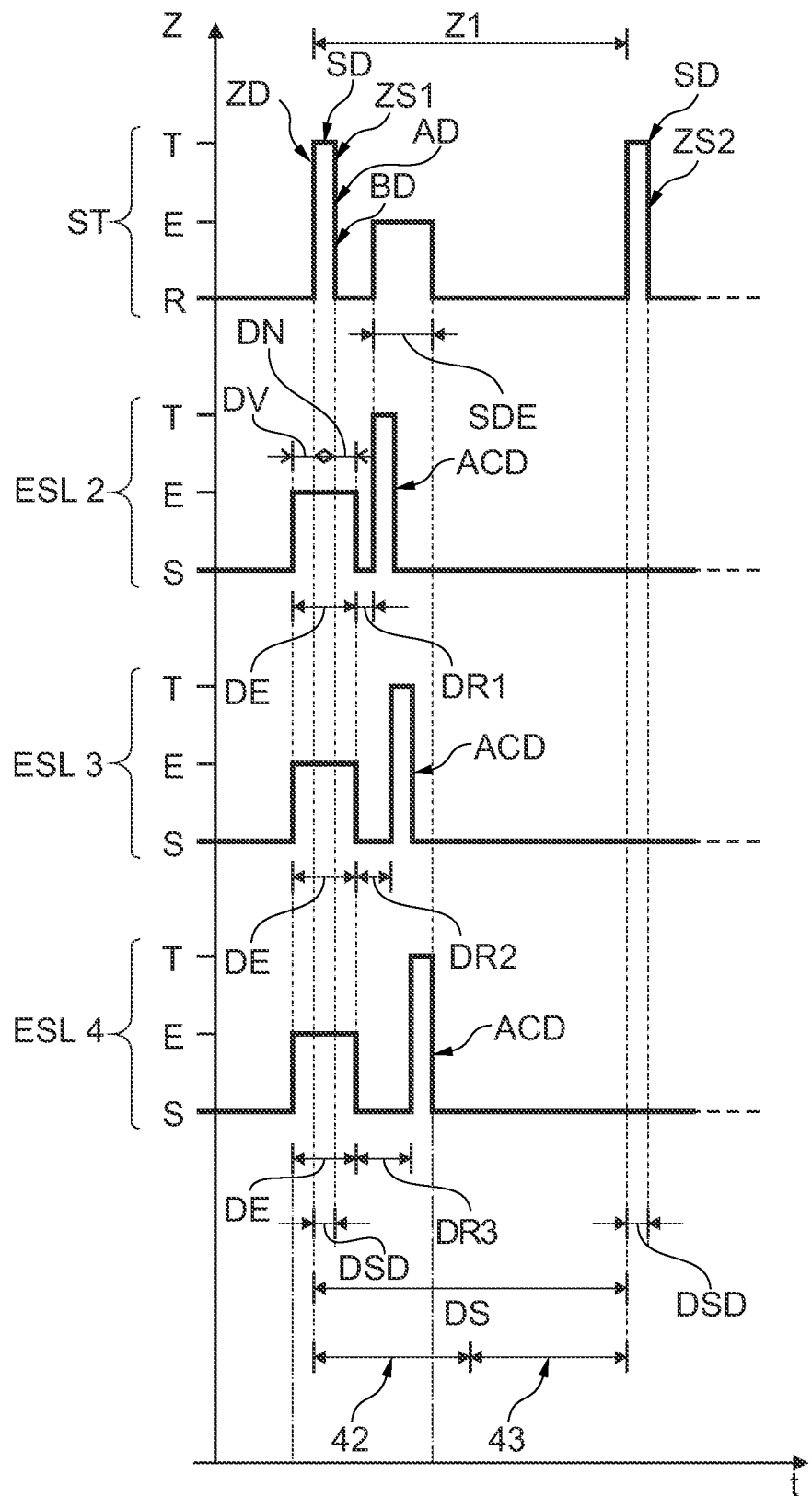
FIG. 3 a second state diagram relating to the ESL communication.
Figure 4:
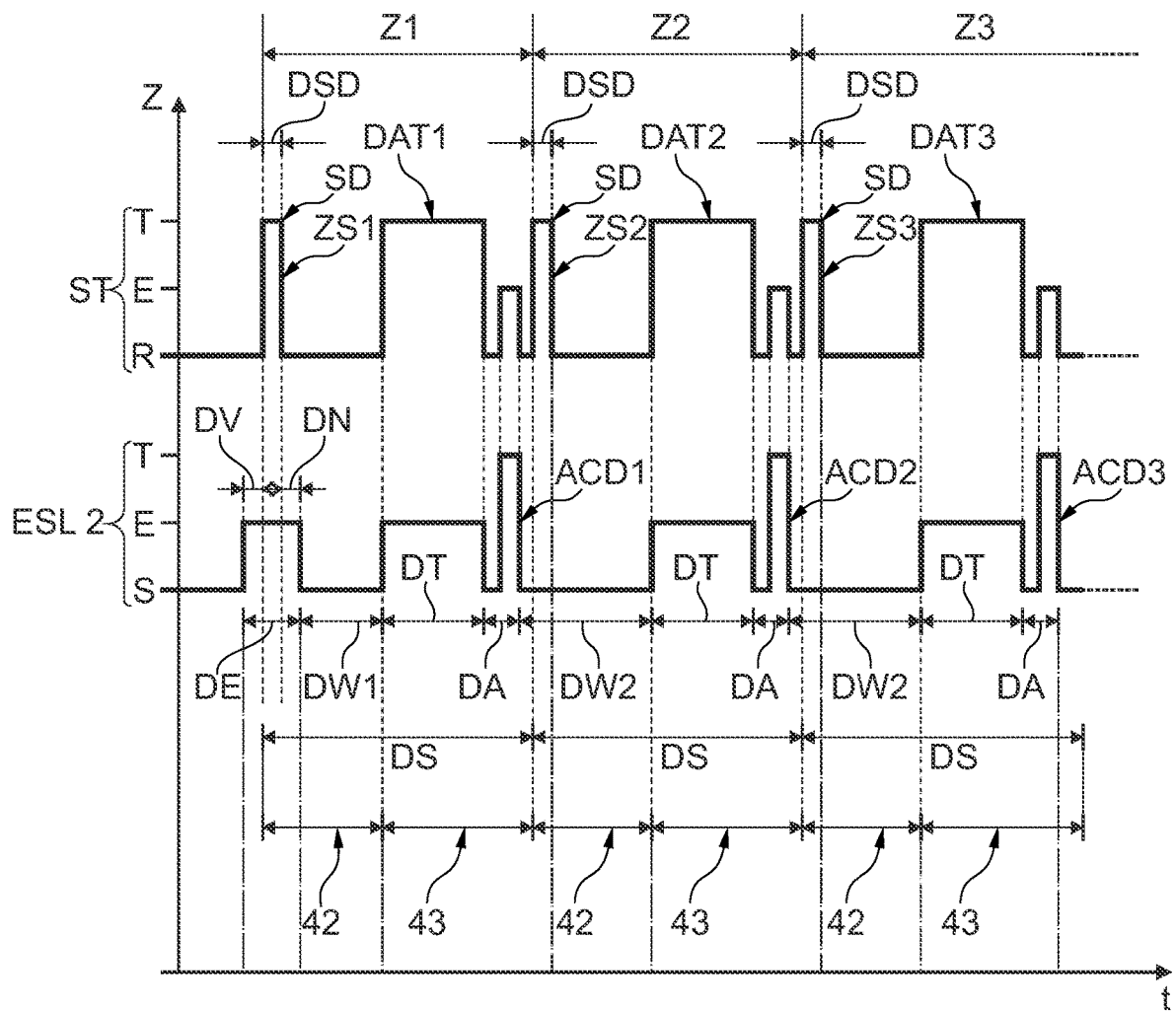
FIG. 4 a third state diagram relating to the ESL communication.

In the communication between the ESLs 2-10 and the ESL radio module 22 to which they are logically/radio-technically assigned by e.g. previous registration, a proprietary time slot communication protocol/communication process is used, the principle of which is visualised in FIGS. 2-4 and with the aid of which the mode of functioning of the system 1 is illustrated. The time t is plotted on the x-axis. States Z of the respective components considered in the discussion/signals of system 1 are plotted on the y-axis. The diagrams show the temporal course of the states.

In FIGS. 2-4 the uppermost state sequence shows the states of the ESL radio module 22 marked with ST. During a time slot cycle duration DC (e.g. 15 seconds) N time slots Z1 ... ZN (e.g. 256) with identical time slot duration DS (e.g. approx. 58 milliseconds) are available. During the time slot cycle duration DC the ESL radio module 22 alternates between a transmitting state T and an idle state R. The transmitting state T is always adopted at the beginning of a time slot Z1 ... ZN and maintained for a synchronisation data signal duration DSD (or for a transmitting time duration DSD of the synchronisation data signal SD) in order to send an applicable time slot symbol ZS1, ZS2, ... ZSN with the respective synchronisation data signal SD. The respectively applicable time slot cycle signal ZS1, ZS2, ... ZSN used is the serial number of the respective time slot Z1 ... ZN in the order of occurrence of the time slots Z1 ... ZN.

FIG. 2 shows that the first ESL 2 is in the synchronous state. It wakes up at a first waking-up time TA1 from its extremely energy-saving sleep state S and changes with a relatively short lead time DV prior to an expected occurrence of a synchronisation data signal SD into its ready-to-receive active state E, receives the synchronisation data signal SD during a receive time duration DE with the first time slot symbol ZS1, ascertains by comparing the lowest-value byte B0 of its hardware address with the received time slot symbol ZS1 that the first time slot Z1 determined for the first ESL 2 is displayed (match of the bytes to be compared: B0 of the hardware address and first time slot symbol ZS1), retains the parameters used for controlling the waking-up for the waking-up in the subsequent time slot cycle for the purpose of defining the new waking-up time and changes back into the sleep state S with a relatively short trailing time DN in order to, following expiry of the envisaged sleep state dwell time DR, wake up as planned at the new second waking-up time TA2 with said lead time DV prior to the renewed beginning of the first time slot cycle Z1. The same applies analogously to the second ESL 3 as well as to all other ESLs 4-10 insofar as they are like the first ESL 1 in the synchronous state. All ESLs 2-10 are configured to recognise a non-synchronous state and to re-synchronise, which by is accompanied a considerably increased energy demand in comparison to that in the sleep state.

With the aid of FIG. 3 individual addressing of ESLs 2-4 as well as individual commissioning of these ESLs 2-4 is discussed with the aid of single time slot demands. The drawing only shows the first time slot Z1 embedded between two synchronisation data signals SD. Address data AD, command data CD and acknowledgement time data ZD are embedded by the ESL radio module 22 in the synchronisation data signal SD of the first time slot Z1. The first ESL 2 is individually addressed with the aid of address data AD (e.g. Hex B2:00:01), the second ESL 3 is addressed with the aid of address data (e.g. Hex B2:00:02) and the third ESL 4 is addressed with the aid of address data (e.g. Hex B2:00:03). With the aid of the command data CD a "PING" command is communicated to the first ESL 2, a "PING" command is also communicated to the second ESL 3 and a "SWAPG2" command is communicated to the third ESL 4. These commands are single time slot commands, which are processed immediately after their decoding in the respective ESL 2-4 with a negligible amount of time. With the aid of the two "PING" commands it is tested whether the addressed ESL 2, 3 reports back with acknowledgement data ACD or whether it exists or at all reacts and is synchronised. With the aid of the "SWAPG2" command a switch-over is initiated for the third ESL 4 from a (first) current memory page to a second memory page in order to e.g. change the image to be shown with the aid of its display. In addition the synchronisation data signal SD is used to communicate an acknowledgement time, by indicating, for the first ESL 2 a first idle time period DR1, for the second ESL 3 a second idle time period DR2, and for the third ESL 4 a third idle time period DR3. The reference point for the three idle time periods DR1-DR3 is always the end of the receive time duration DE. Instead of individual idle time periods DR1-DRD3 maximum time durations for replying may be set, which result from the sum of the respective idle time duration DR1-DR3 and the time period for issuing the acknowledgement data ACD. According to FIG. 3 all three ESLs 2-4 recognise that they are synchronous because the first time slot symbol Z1 indicates the time slot destined for it (lowest-value byte B0 of the hardware address is Hex 00 for all three ESLs 2-4). The check of the address data AD indicates that each ESL 2-4 is individually addressed (existence of the three remaining bytes B1-B3 of the respective hardware address in the address data AD), the commands destined for the respective ESL 2-4 are decoded and immediately executed, and, following expiry of the individual idle time periods DR1 . . . DR3 at the end of the receive time duration DE, the individual acknowledgement data ACD is communicated to the ESL radio module 22, which during a station receive time duration SDE is ready to receive the acknowledgement data ACD. Processing of the single time slot commands including the communication of the acknowledge data ACD is completed in a first part 42 of the time slot Z1, so that a second part 43 is available for other tasks such as the processing of multiple time slot commands, which is discussed in more detail below.

FIG. 4 shows the processing of a multiple time slot command, where the first ESL 2, across three adjacent time slots Z1-Z3, receives data total (e.g. concerning an overall image or only a single image plane of the image to be depicted) divided into three data packets DAT1-DAT3 from the ESL radio module 22. The first ESL 2 recognises, with the aid of the synchronisation data signal SD, its synchronous state and the fact that it has been individually addressed (address data Hex B2:00:01) and it receives and decodes a "DATA INIT" command, with which it is told to receive the three data packets DAT1-DAT3 in said time slots Z1-Z3, and, at the end of the receive duration DE enters into the sleep state S for a first waiting period during DW1, wherein the first waiting period DW1 expires with the end of the first half of the time slot duration DS. At the beginning of the second part 43 of the first time slot Z1 the ESL radio module 22 enters into its transmitting state T and the first ESL 2 enters into its ready-to-receive active state E, so that it receives the first data packet DAT1 during a data transmission period DT. Thereafter it acknowledges the successful receipt with the aid of partial acknowledgement data ACD1 during an acknowledgement time duration DA, during which the ESL radio module 22 is also in the receiving state E. The acknowledgement time duration DA ends prior to the end of the first time slot Z1. After expiry of the acknowledgement time duration DA the first ESL 2 dwells in the sleep state S for a second waiting period DW2, which extends until the end of the first part 42 of the second (subsequent) time slot 22. At the beginning of the second part 43 of the second time slot 22 the ESL radio module 22 enters into its transmission state T and the first ESL 2 enters into its ready-to-receive active state E, so that it receives the second data packet DAT2 during a data transmission period DT. The same applies to the third time slot Z3, at the end of which data transmission is finished. Each successfully transmitted data packet DAT1-DAT3 is acknowledged with the aid of partial acknowledgement data ACD1-ACD3.

The data transmissions to be performed by the two radio modules 21 and 22 are communicated from the server 18 to the station 17 prior to their actual arrival and stored there in the volatile storage area of the storage tier 25 on the one hand in a first queue data structure 38 as a sequence of future radio activities for the WiFi radio module 21 and, on the other hand, in a second queue data structure 39 as a sequence of future radio activities for the ESL radio module 22. Access to the first queue data structure 38 is effected via the first control stage 26, in order to control the WiFi radio activity of the WiFi radio module 21 corresponding to the stored entries in accordance with the WiFi communication protocol used. Access to the second queue data structure 39 is effected via the second control stage 27, in order to control the ESL radio activity of the ESL radio module 22 corresponding to the stored entries in accordance with the discussed time slot communication protocol. The control states 26 and 27 operate synchronously, wherein they use a common time basis of the electronic circuit 20. They always read the description of the respective radio activity stored in the respective queue data structure 38/39 for the actual point in time and implement this by controlling the associated radio module 21/22.

Moreover the station 17 comprises a third, separately configured software-based control stage 28, which also utilises the common time basis and changes the sequences of WiFi radio activities stored in the first queue data structure 38 on the basis of the sequences of ESL radio activities stored in the second queue data structure 39. The third control stage 28 ignores the radio activity/activities present for the current moment and only considers that sequence of radio activities, which follow next in terms of time and occur within a maximum future time period of approx. one second. Radio activities going beyond this temporal horizon/possibly occurring at a later stage and which are, as the case may be, defined in the respective queue data structure 38/39, are not taken into account until over time they are within said future time period.

The functional principles/designs of the third control stage 28 are discussed below by way of example with the aid of FIGS. 5-6.

In the present case it may now be assumed according to a first embodiment that channels with (at least partially) overlapping frequencies are used for the radio activities of the two radio modules 21 and 22, from which it follows that apart from receiving radio activities (such as e.g. the receipt of acknowledgement data ACD or partial acknowledgement data ACD1-ACD3) transmitting radio activities of the ESL radio module (in particular for sending the synchronisation data signal SD) are also to be coordinated/to be taken into account during predictive planning.

Figure 5:
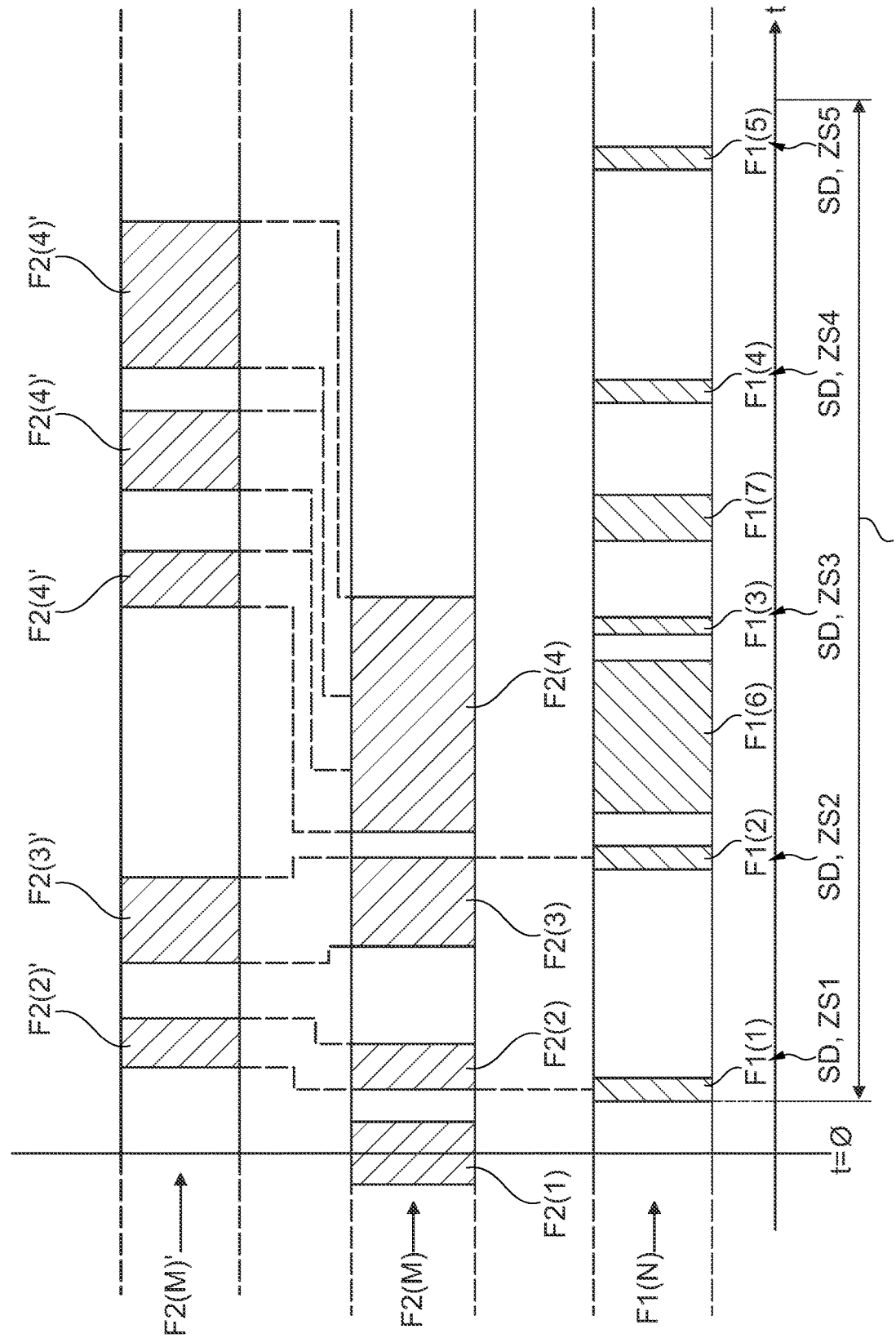
FIG. 5 a first radio activities diagram.

In FIG. 5 the ESL radio activities F1(N) are depicted in the lower area and the WiFi radio activities F2(M) are depicted in the central area across the time axis t, wherein the bracketed letters N and M representing a positive integer each indicate the serial number of the respective radio activity F1(1)-F1(5)/F2(1) F2(4). The radio activity F2(1) present at the point in time t=0 (presence) is being presently implemented by the WiFi radio module 22 and therefore is no longer taken into account by the third control stage 28 because it had already been taken into account at an earlier point in time. The third control stage 28 only considers the future ESL radio activities F1(1)-F1(7) and the future WiFi radio activities F2(1)-F2(4), which occur within the future time period TD and are stored in the respective queue data structure 38/39. Entries in the respective queue data structure 38/39 going beyond this temporal horizon are not taken into account until, as time progresses, i.e. when the time stamp t=0 (presence) moves to the right, these other entries enter into the temporal horizon (right-hand end) of the future time period TD.

In the present case the radio activities F1(1) to F1(5) refer to the emission of the synchronisation data signal SD comprising the respective time slot symbol ZS1-256, which is essential for maintaining the synchronism in the ESL radio system. They essentially occupy time ranges of the same length. The radio activities F1(6)/F1(7) refer to a communication in the ESL radio system as specified in the description of FIG. 3 or 4. They can occupy time ranges of different duration depending on the actual data content/data volume.

In the present case the third control stage 28 knows the temporal behaviour of the ESL communication protocol and prioritises the ESL radio activities F1(1)-F1(7) over the WiFi radio activities F2(1)-F2(4). Accordingly it intervenes in the time sequence of the of WiFi radio activities F2(1)-F2(4) and changes these as shown in the uppermost section of FIG. 5, where the sequence of WiFi radio activities F2(M)' modified as regards its temporal occurrence is depicted for the future time period TD, so that the ESL radio activities F1(1)-F1(7) can be implemented without interruption. In this respect the WiFi activity:

F2(2), which would begin in the time range of the ESL radio activity F1(1), is moved slightly into the future (see F2(2)'), so that it starts after the ESL radio activity F1(1), F2(3), which would end in the time range of the ESL radio activity F1(2), is brought forward slightly, (see F2(3)'), so that it ends before the ESL radio activity F1(2), wherein the time range remaining after the WiFi radio activity F2(2)' is optimally utilised prior to the occurrence of the ESL radio activity F1(2), F2(4), which would overlap with the ESL radio activities F1(6) and F1(3), is divided across later time ranges between the ESL radio activities F1(3), F1(7), F1(4) and F1(5) (see three radio activities F2(4)').

Figure 6:
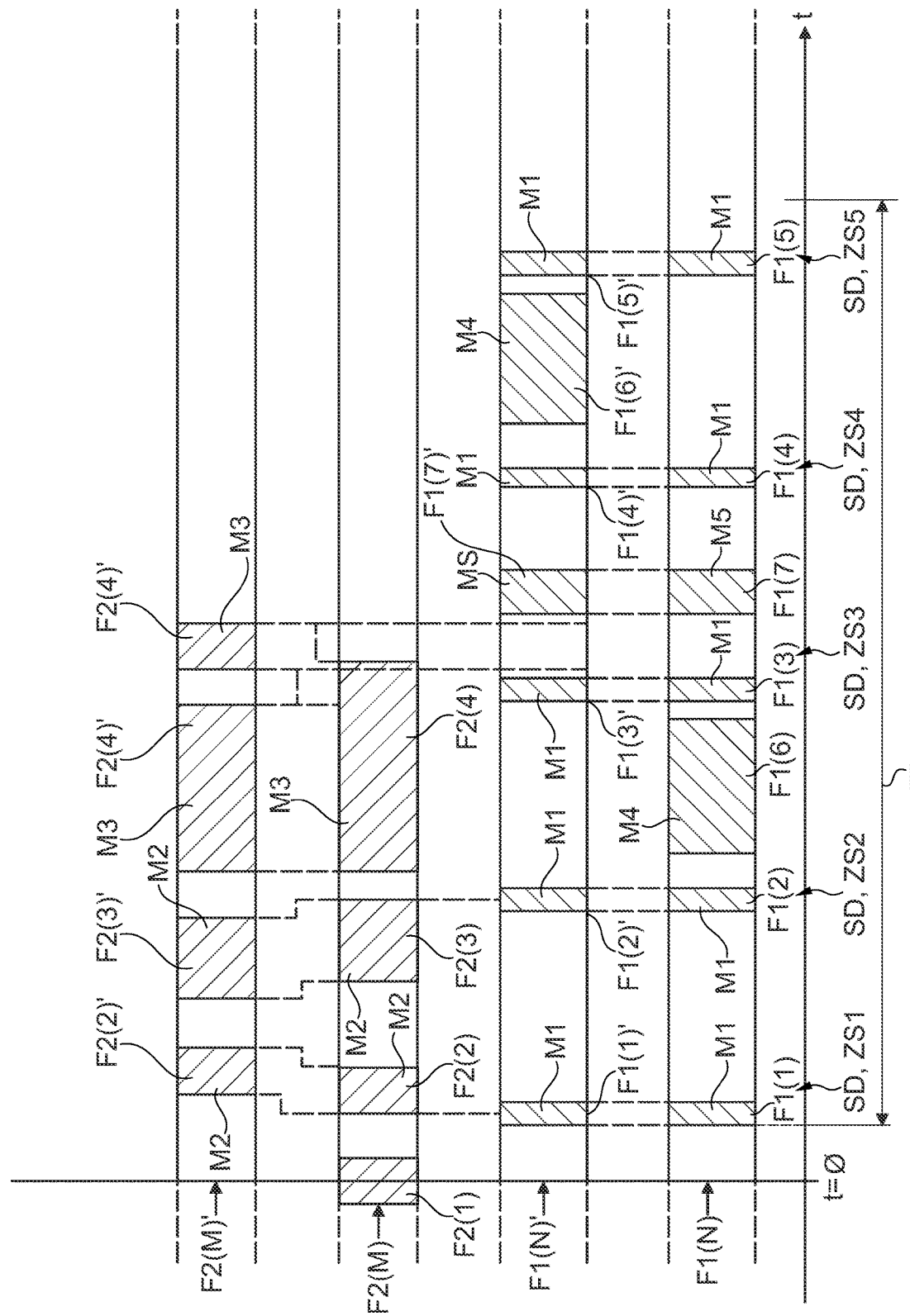
FIG. 6 a second radio activities diagram.

According to a further development of the previously discussed design of station 17 metadata M1-M5 is used for the respective radio activities F1(N) and F2(M), wherein reference should be made to FIG. 6. Furthermore the third control stage 28 is configured for changing the time sequence of the WiFi radio activities F2(M) and the ESL radio activities F1(N) with regard to metadata M1-M5. The change in the time sequence of the ESL radio activities F1(N) is visualised in diagram section F1(N)' and the change in the time sequence of the WiFi radio activities F2(M) is visualised in diagram section F2(M)'.

Furthermore it may be assumed that maintaining the synchronism of the ESL radio system is given the highest priority. First metadata M1 thus defines the highest priority for the radio activities F1(1)-F1(5), as well as a ban to change their temporal distance from each other or to let them occur in a different order from that in the sequence of radio activities F1(N). The third control stage 28 thus keeps them in their original time ranges, as can be seen when comparing diagram F1(N) with diagram F1(N)'.

For the two WiFi radio activities F2(2) and F2(3) second metadata defines the lowest priority and the fact that their temporal occurrence as well as the temporal distance from adjacent radio activities is non-critical, namely variable. The third control state 28 thus moves them between the two ESL radio activities F1(1)' and F1(2)'.

In addition third metadata M3 defines that the radio activity F2(4) has second highest priority, but that its temporal context is non-critical, which means that it can be divided up across different time ranges. Fourth metadata M4, which characterises the ESL radio activity F1(6), defines a lower priority than for the WiFi radio activity F2(4) and permits to perform the ESL radio activity F1(6) in another but contiguous time range. In addition fifth metadata M5 defines that the ESL radio activity F1(7) also is to be performed with the highest priority and in an immovable and undividable manner. Building on this information the third control stage 28 divides the WiFi radio activity F2(4) up in such a way that a longer part occurs prior to the ESL radio activity F1(3)' and shorter part occurs after it, but prior to the ESL radio activity F1(7)', for which no temporal change is planned relative to radio activity F1(7) (see two radio activities F2(4)'). Furthermore the ESL radio activity F1(7) is left in its originally defined time range (see F1(7)'). Finally the ESL radio activity F1(6) is moved into the next available time range as regards its required duration, namely into the time range between the ESL radio activities F1(4)' and F1(5)' (see F1(6)' in there).

The result of the respective change is depicted in the diagram sections F1(N)' and F2(M)', where it can be seen that no temporal overlapping of radio activities exists when comparing the two diagram sections F1(N)' and F2(M)'.

Furthermore it may now be assumed according to a second exemplary embodiment that channels without overlapping frequencies are used for the radio activities of the two radio modules 21 and 22. The advantage of this is that the focus during predictive planning 1 coordinating now lies on the signals which are emitted by the ESLS 2-10. These are, although not exhaustively listed, e.g. the acknowledgement data ADC/partial acknowledgement data ACD1-ACD3, for which it is predictively ensured according to the previously discussed function principles that no interferences can occur in the common radio medium.

In conclusion it is to be pointed out once more that the figures described in detail above are exemplary embodiments, which may be modified in the most varied ways by the expert without leaving the scope of the invention. For completeness sake it is to be noted that use of the indefinite article "a" does not exclude that there may be more than one incidence of the respective features.

The invention claimed is:

1. A radio base station comprising:
a first radio module for radio communication with first radio communication devices;
a connection for connecting an electronic price display sign (ESL) radio module for radio communication with electronic display signs; and
an electronic circuit configured to:
control the radio communication of the first radio module in accordance with a first communication protocol,
control the radio communication of the ESL radio module connectable to the connection in accordance with a second communication protocol, and
predictively change a time sequence defined for a future time period of radio activities of the first radio module on the basis of radio activities of the ESL radio module, which are defined for said future time period.

2. The radio base station according to claim 1, further comprising:
a storage tier for storing:
a first queue data structure representing the time sequence of radio activities of the first radio module, and
a second queue data structure representing a time sequence of radio activities of the ESL radio module, wherein
the electronic circuit is configured for reading the second queue data structure and, in consideration of the time sequence of radio activities defined therein, for changing the time sequence stored in the first queue data structure of the radio activities for said future time period.

3. The radio base station according to claim 2, wherein the electronic circuit is further configured to predictively change said time sequence of radio activities of the ESL radio module, as defined by the electronic circuit, on the basis of the radio activities of the first radio module which are defined by the electronic circuit for said future time period.

4. The radio base station according to claim 3, wherein the electronic circuit is further configured to read the first queue data structure and, in consideration of the time sequence of radio activities defined therein, to change the time sequence stored in the second queue data structure of the radio activities for said future time period.

5. The radio base station according to claim 1, wherein the electronic circuit is further configured to change a respective queue data structure in such a way that:
the radio activities defined as mandatory are maintained as regards the temporal occurrence in time ranges provided for them and/or the succession of temporal occurrences in the provided succession of the time ranges, and
other radio activities are defined in intermediate time ranges or subsequent time ranges.

6. The radio base station according to claim 5, wherein the electronic circuit is configured to take metadata into account, wherein the metadata is stored in the respective queue data structure and indicates a necessity of the temporal occurrence of the respective radio activity or a type of the respective radio activity.

7. The radio base station according to claim 5, wherein the electronic circuit is further configured to make iterative changes such that initially the radio activities defined as mandatory are taken into account and only thereafter the other radio activities for said future time period are taken into account.

8. The radio base station according to claim 1, wherein the electronic circuit is further configured for continuous or stepwise adjustment of the change in the time sequence of radio activities to be initiated by the electronic circuit for said future time period, as time passes and new radio activities are added.

9. The radio base station according to claim 1, wherein the electronic circuit comprises the connection and a programmable circuit component for processing a software with the aid of which:
the radio communication of the first radio module in accordance with the first communication protocol is realised,
and/or
the radio communication of the ESL radio module connectable to the connection in accordance with the second communication protocol is realised,
and/or
the predictively changing of the time sequence defined for the future time period of radio activities of the first radio module on the basis of radio activities of the ESL radio module is realised.

10. A system comprising:
the radio base station according to claim 1; and
the ESL radio module connected to the connection.

11. The system according to claim 10, further comprising a server coupled to the radio base station for providing and/or processing data concerning the radio communication with the first radio communication devices and/or the electronic display signs.

12. A method for controlling a radio communication of a radio base station, wherein the radio base station comprises:
a first radio module for radio communication with first radio communication devices;
a connection for connecting an electronic price display sign (ESL) radio module for radio communication with electronic display signs; and
an electronic circuit,
wherein according to the method:
the electronic circuit controls the communication of the first radio module according to a first communication protocol;
the electronic circuit controls the communication of the ESL radio module connected to the connection according to a second communication protocol; and
the electronic circuit predictively changes a time sequence of radio activities of the first radio module as defined for a future time period on the basis of radio activities of the ESL radio module, as defined for said future time period.

13. The method according to claim 12, wherein the electronic circuit also predictively changes a time sequence of radio activities of the ESL radio module, as defined by the electronic circuit for said future time period, on the basis of the radio activities of the first radio module, as defined by the electronic circuit for said future time period.

14. The method according to claim 12, wherein the electronic circuit performs the respective change in such a way that:
the radio activities defined as mandatory are maintained as regards the temporal occurrence in time ranges provided for them and/or the succession of temporal occurrences in the provided succession of such time ranges, and
other radio activities are defined in intermediate or subsequent time ranges within the future time period.

15. The method according to claim 14, wherein the change effected by the electronic circuit is performed iteratively in such a way that initially the radio activities defined as mandatory are taken into account and only thereafter the other radio activities for said future time period are taken into account.

* * * * *